(12) United States Patent
Liu (10) Patent No.: US 10,938,773 B2
(45) Date of Patent: Mar. 2, 2021

(54) METHOD AND APPARATUS FOR SYNCHRONIZING CONTACT INFORMATION AND MEDIUM

(71) Applicant: GUANGDONG OPPO MOBILE TELECOMMUNICATIONS CORP., LTD., Guangdong (CN)

(72) Inventor: Kun Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 56 days.

(21) Appl. No.: 16/329,846

(22) PCT Filed: Aug. 2, 2017

(86) PCT No.: PCT/CN2017/095686
§ 371 (c)(1),
(2) Date: Mar. 1, 2019

(87) PCT Pub. No.: WO2018/076871
PCT Pub. Date: May 3, 2018

(65) Prior Publication Data
US 2019/0245827 A1    Aug. 8, 2019

(30) Foreign Application Priority Data
Oct. 25, 2016  (CN) .......................... 201610949321.5

(51) Int. Cl.
*G06F 15/16* (2006.01)
*H04L 29/12* (2006.01)
(Continued)

(52) U.S. Cl.
CPC ...... *H04L 61/1552* (2013.01); *H04L 61/1594* (2013.01); *H04L 67/1095* (2013.01);
(Continued)

(58) Field of Classification Search
CPC ............ G06F 16/137; H04M 1/2757; H04M 2242/40; H04L 67/306; H04L 61/1594
See application file for complete search history.

(56) References Cited

U.S. PATENT DOCUMENTS

| 2007/0156434 | A1* | 7/2007 | Martin .................... G06F 16/51 705/1.1 |
| 2011/0170682 | A1 | 7/2011 | Kale et al. |

(Continued)

FOREIGN PATENT DOCUMENTS

| CN | 103297598 | 9/2013 |
| CN | 103327189 | 9/2013 |

(Continued)

OTHER PUBLICATIONS

SIPO, First Office Action of CN Application No. 201610949321, dated Dec. 25, 2018.

(Continued)

*Primary Examiner* — Umar Cheema
*Assistant Examiner* — Tesfu N Mekonen
(74) *Attorney, Agent, or Firm* — Hodgson Russ LLP (57) ABSTRACT

A method and an apparatus for synchronizing contact information and a medium are disclosed. The method may include: acquiring a processing request for synchronizing the contact information; acquiring head portrait information in the contact information and feature identification data of the head portrait information in response to the processing request; determining portrait status of the head portrait information based on the feature identification data; and performing a synchronizing operation on the head portrait information based on the portrait status of the head portrait information.

14 Claims, 5 Drawing Sheets

(51) Int. Cl.
  *H04L 29/08* (2006.01)
  *H04M 1/2757* (2020.01)
(52) U.S. Cl.
  CPC ........ *H04L 67/2828* (2013.01); *H04L 67/306* (2013.01); *H04M 1/2757* (2020.01); *H04M 2242/40* (2013.01)

(56) References Cited

U.S. PATENT DOCUMENTS

| | | | |
|---|---|---|---|
| 2013/0129258 A1* | 5/2013 | Conrad | G06F 16/50 |
| | | | 382/305 |
| 2013/0262452 A1 | 10/2013 | Kvernvik et al. | |
| 2014/0081926 A1* | 3/2014 | Adams | G06F 16/51 |
| | | | 707/692 |
| 2015/0207899 A1 | 7/2015 | Yoshikawa et al. | |
| 2015/0304417 A1* | 10/2015 | Tan | H04L 67/1095 |
| | | | 707/610 |
| 2016/0379042 A1* | 12/2016 | Bourlai | G06K 9/00228 |
| | | | 382/118 |
| 2017/0046563 A1* | 2/2017 | Kim | G06K 9/00275 |
| 2018/0069937 A1* | 3/2018 | Kolleri | H04M 1/72569 |
| 2018/0159928 A1 | 6/2018 | Jin | |
| 2019/0208014 A1* | 7/2019 | Goldberg | G06F 16/11 |

FOREIGN PATENT DOCUMENTS

| | | |
|---|---|---|
| CN | 103685406 | 3/2014 |
| CN | 103916423 | 7/2014 |
| CN | 203825670 | 9/2014 |
| CN | 104883404 | 9/2015 |
| CN | 105100349 | 11/2015 |
| CN | 105631048 | 6/2016 |
| CN | 105635215 | 6/2016 |
| CN | 106657254 | 5/2017 |

OTHER PUBLICATIONS

WIPO, ISR for PCT/CN2017/095686, Sep. 30, 2017.
SIPO, Second Office Action for CN Application No. 201610949321, dated May 8, 2019.
EPO, Office Action for EP Application No. 17865941.3, dated Aug. 1, 2019.
IPI, Office Action for IN Application No. 201917011628, dated Dec. 30, 2020.

* cited by examiner

METHOD AND APPARATUS FOR SYNCHRONIZING CONTACT INFORMATION AND MEDIUM

CROSS-REFERENCE TO RELATED APPLICATIONS

This application is a U.S. national phase application of International Application No. PCT/CN2017/095686, filed on Aug. 2, 2017, which claims priority to Chinese Patent Application No. 201610949321.5, filed on Oct. 25, 2016, the entire disclosures of which are incorporated herein by reference.

TECHNICAL FIELD

The present disclosure relates to a field of communications technologies, and in particular, to a method and an apparatus for synchronizing contact information, and a medium.

BACKGROUND

With the development of terminals, more and more functions are able to be compatible in a terminal, which not only enriches the user's life, but also brings convenience to the user. In order to implement various functions to meet various needs of users, various application programs (which may be simply referred to as applications) may generally be installed on the terminal. However, when the terminal synchronizes the personal information of the stored contacts, redundant network data transmission may be caused when there are same data, resulting in waste of traffic.

SUMMARY

Embodiments of the present disclosure provide a method and an apparatus for synchronizing contact information, a medium, an electronic device and a system.

Embodiments of the present disclosure provide a method for synchronizing contact information, including: acquiring a processing request for synchronizing the contact information; acquiring head portrait information in the contact information and feature identification data of the head portrait information in response to the processing request; determining portrait status of the head portrait information based on the feature identification data; and performing a synchronizing operation on the head portrait information based on the portrait status of the head portrait information.

Embodiments of the present disclosure also provide an apparatus for synchronizing contact information, including: a first acquiring unit, configured to acquire a processing request for synchronizing the contact information; a second acquiring unit, configured to acquire head portrait information in the contact information and feature identification data of the head portrait information in response to the processing request; a determining unit, configured to determine portrait status of the head portrait information based on the feature identification data; and a synchronizing unit, configured to perform a synchronizing operation on the head portrait information based on the portrait status of the head portrait information.

Embodiments of the present disclosure provide a medium, storing a plurality of instructions adaptive to be loaded by a processor to perform all or a part of the above-mentioned method for synchronizing contact information.

BRIEF DESCRIPTION OF THE DRAWINGS

In order to make technical solutions in embodiments of the present disclosure more apparent, drawings needed to be used in descriptions of the embodiments will be illustrated in the following. Obviously, the drawings to be illustrated in the following merely represent some embodiments of the present disclosure, and other drawings may be obtained according these drawings by those having ordinary skills in the related art without making creative labors.

DETAILED DESCRIPTION

The technical solutions in embodiments of the present disclosure are hereinafter described clearly and completely with reference to accompanying drawings in embodiments of the present disclosure. Apparently, embodiments described are a part of embodiments of the present disclosure, but not all embodiments. All other embodiments obtained by those skilled in the art based on the embodiments in the present disclosure without creative labor shall fall in the protection scope of the present disclosure.

Embodiments of the present disclosure provide a method and an apparatus for synchronizing contact information, a medium, an electronic device and a system. The details will be described respectively below.

During the communication service of the user via the terminal, personal information of contacts may be stored in the terminal. In order to prevent the loss of the personal information of the contacts caused by the user losing the terminal or replacing the terminal, the terminal may upload the personal information of the contacts from the terminal to the server, such that the server may store the personal information of the contacts. The user may also download the personal information of the contacts from the server to achieve data synchronization.

In the long-term research and development process, the inventors of the present application find out that the head portrait information needs to be supported during the synchronization of the contact information. However, the head portrait information is generally large (>20 KB). If the head portrait information is directly uploaded to the server or downloaded from the server like other data (such as phone numbers, emails, etc.), there may be repeated transmission of the same data, resulting in redundant network data transmission operations, which not only wastes the traffic but also affects the synchronization efficiency.

To this end, the present disclosure provides solutions for synchronizing contact information. The details will be described as follows.

A system for synchronizing contact information is provided. The system includes a server and an electronic device. The electronic device includes a memory, a processor, and a computer program being stored in the memory and executable in the processor, the processor being caused to perform following acts when executing the computer program: acquiring a processing request for synchronizing the contact information; acquiring head portrait information in the contact information and feature identification data of the head portrait information in response to the processing request; determining portrait status of the head portrait information based on the feature identification data; and performing a synchronizing operation on the head portrait information based on the portrait status of the head portrait information.

The system for synchronizing contact information provided by the embodiment of the present disclosure mainly includes an apparatus for synchronizing contact information and the server. The apparatus for synchronizing contact information may be specifically integrated in the electronic device, and the server may be connected to the electronic device via a wired or wireless network. The electronic device may include a terminal, such as a tablet computer, a mobile phone and the like.

Figure 1:
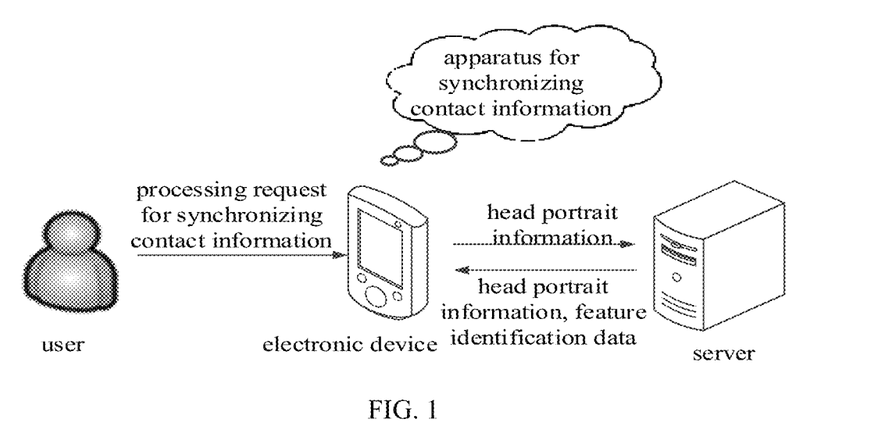
FIG. 1 illustrates a diagram of a scene of a system for synchronizing contact information according to an embodiment of the present disclosure.

FIG. 1 is a diagram of a scene of a system for synchronizing contact information provided by the present disclosure. Specifically, the apparatus for synchronizing the contact information is integrated in a mobile phone, and is mainly configured to obtain a processing request for synchronizing the contact information inputted by a user, and then, to acquire head portrait information in the contact information and feature identification data (such as a hash value and a uniform resource locator (URL)) of the head portrait information in response to the processing request. After that, portrait status of the head portrait information may be determined based on the feature identification data. Finally, a synchronizing operation, for example, downloading the head portrait information from a server, or uploading the head portrait information to the server and the like, may be performed on the head portrait information based on the portrait status of the head portrait information.

In addition, as shown in FIG. 1, the system for synchronizing the contact information may also include the server, which stores a large amount of contact information, such as telephone information, mailbox information, and head portrait information, and the like, and also stores feature identification data of the head portrait information, such as, a hash value and a uniform resource locator URL. The server is mainly configured to push the head portrait information to the terminal, or to receive the uploaded head portrait information according to the determination result of the portrait status of the head portrait information by the terminal, so as to complete the head portrait information synchronization.

In the embodiment, the description will be made from a perspective of the apparatus for synchronizing contact information.

A method for synchronizing contact information is provided. The method includes: acquiring a processing request for synchronizing the contact information; acquiring head portrait information in the contact information and feature identification data of the head portrait information in response to the processing request; determining portrait status of the head portrait information based on the feature identification data; and performing a synchronizing operation on the head portrait information based on the portrait status of the head portrait information.

In some embodiments, before determining the portrait status of the head portrait information based on the feature identification data, the method may also include: determining whether the head portrait information is NULL in a local terminal to obtain a first determination result; and determining the portrait status of the head portrait information based on the feature identification data may include: determining the portrait status of the head portrait information based on the feature identification data and the first determination result.

In some embodiments, determining the portrait status of the head portrait information based on the feature identification data and the first determination result may include: retrieving a uniform resource locator in the feature identification data from a server; determining whether the uniform resource locator in the feature identification data is NULL in the server to obtain a second determination result; and determining the first determination result and the second determination result as the portrait status of the head portrait information.

In some embodiments, performing the synchronizing operation on the head portrait information based on the portrait status of the head portrait information may include: setting the head portrait information in the local terminal as NULL when the first determination result indicates that the head portrait information is NULL in the local terminal and the second determination result indicates that the uniform resource locator is NULL in the server.

In some embodiments, performing the synchronizing operation on the head portrait information based on the portrait status of the head portrait information may include: determining whether historical synchronization information of the head portrait information exists in the local terminal when the first determination result indicates that the head portrait information is NULL in the local terminal and the second determination result indicates that the uniform resource locator is not NULL in the server; setting the head portrait information in the local terminal as NULL when the historical synchronization information of the head portrait information exists in the local terminal; and downloading the head portrait information from the server through the uniform resource locator when no historical synchronization information of the head portrait information exists in the local terminal.

In some embodiments, performing the synchronizing operation on the head portrait information based on the portrait status of the head portrait information may include: uploading the head portrait information from the local terminal to the server when the first determination result indicates that the head portrait information is not NULL in the local terminal and the second determination result indicates that the uniform resource locator is NULL in the server.

In some embodiments, performing the synchronizing operation on the head portrait information based on the portrait status of the head portrait information may include: when the first determination result indicates that the head portrait information is not NULL in the local terminal and the second determination result indicates that the uniform resource locator is not NULL in the server, computing a hash value of the head portrait information in the local terminal to obtain a first hash value, acquiring a second hash value sent by the server, and determining whether the first hash value is different from the second hash value; determining whether historical synchronization information of the head portrait information exists in the local terminal when the first hash value is different from the second hash value; and uploading the head portrait information from the local terminal to the server when the historical synchronization information of the head portrait information exists in the local terminal; and downloading the head portrait information from the server through the uniform resource locator when no historical synchronization information of the head portrait information exists in the local terminal.

In some embodiments, performing the synchronizing operation on the head portrait information based on the portrait status of the head portrait information may include: setting the head portrait information in the local terminal as NULL when the first determination result indicates that the head portrait information is NULL in the local terminal and the second determination result indicates that the uniform resource locator is NULL in the server; determining whether historical synchronization information of the head portrait information exists in the local terminal when the first determination result indicates that the head portrait information is NULL in the local terminal and the second determination result indicates that the uniform resource locator is not NULL in the server; setting the head portrait information in the local terminal as NULL when the historical synchronization information of the head portrait information exists in the local terminal; and downloading the head portrait information from the server through the unified resource locator when no historical synchronization information of the head portrait information exists in the local terminal.

In some embodiments, performing the synchronizing operation on the head portrait information based on the portrait status of the head portrait information may include: uploading the head portrait information from the local terminal to the server when the first determination result indicates that the head portrait information is not NULL in the local terminal and the second determination result indicates that the uniform resource locator is NULL in the server; when the first determination result indicates that the head portrait information is not NULL in the local terminal and the second determination result indicates that the uniform resource locator is not NULL in the server, computing a hash value of the head portrait information in the local terminal to obtain a first hash value, acquiring a second hash value sent by the server, and determining whether the first hash value is different from the second hash value; determining whether historical synchronization information of the head portrait information exists in the local terminal when the first hash value is different from the second hash value; uploading the head portrait information from the local terminal to the server when the historical synchronization information of the head portrait information exists in the local terminal; and downloading the head portrait information from the server through the uniform resource locator when no historical synchronization information of the head portrait information exists in the local terminal.

In some embodiments, performing the synchronizing operation on the head portrait information based on the portrait status of the head portrait information may include: setting the head portrait information in the local terminal as NULL when the first determination result indicates that the head portrait information is NULL in the local terminal and the second determination result indicates that the uniform resource locator is NULL in the server; determining whether historical synchronization information of the head portrait information exists in the local terminal when the first determination result indicates that the head portrait information is NULL in the local terminal and the second determination result indicates that the uniform resource locator is not NULL in the server; setting the head portrait information in the local terminal as NULL when the historical synchronization information of the head portrait information exists in the local terminal; downloading the head portrait information from the server through the uniform resource locator when no historical synchronization information of the head portrait information exists in the local terminal; uploading the head portrait information from the local terminal to the server when the first determination result indicates that the head portrait information is not NULL in the local terminal and the second determination result indicates that the uniform resource locator is NULL in the server; when the first determination result indicates that the head portrait information is not NULL in the local terminal and the second determination result indicates that the uniform resource locator is not NULL in the server, computing a hash value of the head portrait information in the local terminal to obtain a first hash value, acquiring a second hash value sent by the server, and determining whether the first hash value is different from the second hash value; determining whether historical synchronization information of the head portrait information exists in the local terminal when the first hash value is different from the second hash value; uploading the head portrait information from the local terminal to the server when the historical synchronization information of the head portrait information exists in the local terminal; and downloading the head portrait information from the server through the uniform resource locator when no historical synchronization information of the head portrait information exists in the local terminal.

Figure 2:
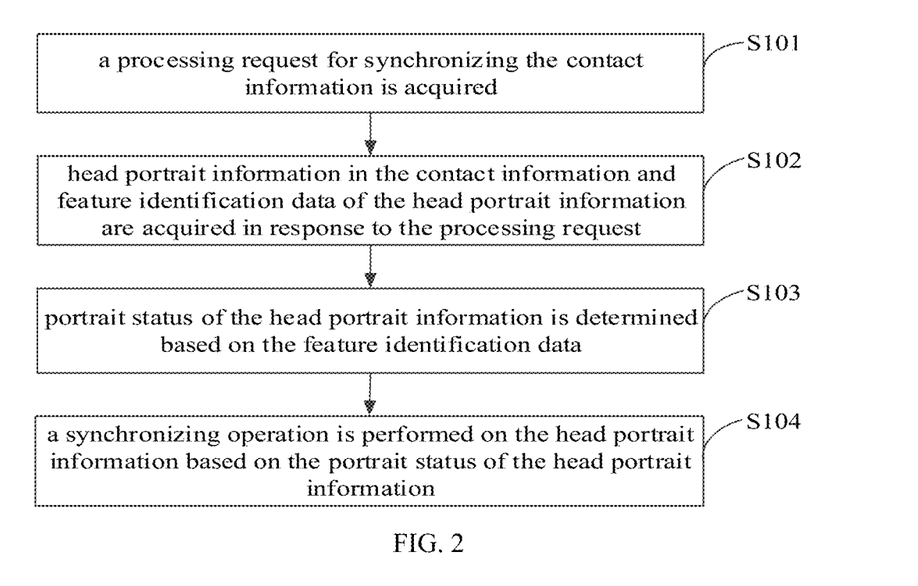
FIG. 2 illustrates a flow chart of a method for synchronizing contact information according to an embodiment of the present disclosure.

FIG. 2 is a flow chart of a method for synchronizing contact information according to an embodiment of the present disclosure. The method includes followings.

At block S101, a processing request for synchronizing the contact information is acquired.

For example, the apparatus for synchronizing the contact information is integrated on the terminal, and the terminal may be preset with a synchronization input interface, such as a terminal application APP for the synchronization, or an input control. The user may trigger the synchronization input interface by clicking, touching, sliding and the like to acquire the processing request for synchronizing the contact information inputted by the user.

The contact information in the embodiments of the present disclosure may specifically include the phone information, the mailbox information, the address information, the head portrait information and the like of the contacts.

At block S102, head portrait information in the contact information and feature identification data of the head portrait information are acquired in response to the processing request.

For example, the apparatus for synchronizing the contact information extracts the head portrait information in the contact information that needs to be synchronized in response to the acquired processing request, and extracts the feature identification data associated with the head portrait information (i.e., the feature identification data representing the head portrait information) at the same time.

It can be understood that, the head portrait information needs to be supported during the synchronization of the contact information. However, the head portrait information is generally large (>20 KB). Therefore, in embodiments of the present disclosure, after the apparatus for synchronizing the contact information receives the processing request, the head portrait information and the feature identification data in the contact information to be synchronized are extracted, such that the feature identification data may be analyzed to determine whether the head portrait information needs to be synchronized.

The feature identification data of the head portrait information in embodiments of the present disclosure mainly refers to data that may represent or identify the head portrait information, such as a hash value, a uniform resource locator URL, and the like.

At block S103, portrait status of the head portrait information is determined based on the feature identification data.

For example, after the apparatus for synchronizing contact information obtains the feature identification data of the head portrait information, the feature identification data may be analyzed and determined, such that the portrait status of the head portrait information is determined according to the result of the analysis and determination.

In some embodiments, the correspondences between the determination results and the portrait statuses may be preset in the apparatus for synchronizing contact information. The portrait status of the head portrait information may be determined based on the head portrait information and feature identification data stored in the terminal itself and stored on the server, which will not be limited herein.

In some embodiments, before determining the portrait status of the head portrait information based on the feature identification data (i.e., the act at block S103), the method may also include: determining whether the head portrait information is NULL in a local terminal to obtain a first determination result.

In other words, it is determined whether the head portrait information of the contact exists in the local terminal, such that the first determination result is obtained. If the head portrait information exists, the head portrait information is not NULL, and if the head portrait information does not exist, the head portrait information is NULL.

Therefore, determining the portrait status of the head portrait information based on the feature identification data (i.e., the act in block S103) may include: determining the portrait status of the head portrait information based on the feature identification data and the first determination result.

In some embodiments, determining the portrait status of the head portrait information based on the feature identification data and the first determination result may specifically include: (11) retrieving a uniform resource locator in the feature identification data from a server; (12) determining whether the uniform resource locator in the feature identification data is NULL in the server to obtain a second determination result; and (13) determining the first determination result and the second determination result as the portrait status of the head portrait information.

In other words, the head portrait information that needs to be synchronized and the feature identification data of the head portrait information are searched from the server firstly, and then the uniform resource locator URL is retrieved from the feature identification data, and it is determined whether the uniform resource locator URL is NULL in the server to acquire the second determination result, and finally the portrait status of the head portrait information is determined according to the first determination result and the second determination result.

For example, the portrait status of the head portrait information may include the following four conditions: (1) the first determination result indicates that the head portrait information is NULL in the local terminal, and the second determination result indicates that the uniform resource locator is also NULL in the server; (2) the first determination result indicates that the head portrait information is NULL in the local terminal, and the second determination result indicates that the uniform resource locator is not NULL in the server; (3) the first determination result indicates that the head portrait information is not NULL in the local terminal, and the second determination result indicates that the uniform resource locator is NULL in the server; (4) the first determination result indicates that the head portrait information is not NULL in the local terminal, and the second determination result indicates that the uniform resource locator is not NULL in the server.

The corresponding synchronization operations will be described based on the four portrait statuses.

At block S104, a synchronizing operation is performed on the head portrait information based on the portrait status of the head portrait information.

In some embodiments, performing the synchronizing operation on the head portrait information based on the portrait status of the head portrait information may specifically include: (a) setting the head portrait information in the local terminal as NULL when the first determination result indicates that the head portrait information is NULL in the local terminal and the second determination result indicates that the uniform resource locator is NULL in the server; (b) determining whether historical synchronization information of the head portrait information exists in the local terminal when the first determination result indicates that the head portrait information is NULL in the local terminal and the second determination result indicates that the uniform resource locator is not NULL in the server; (b1) setting the head portrait information in the local terminal as NULL when the historical synchronization information of the head portrait information exists in the local terminal; and (b2) downloading the head portrait information from the server through the unified resource locator when no historical synchronization information of the head portrait information exists in the local terminal.

In other words, when it is determined that the head portrait information of the contact information is NULL in the local terminal, it is necessary to determine whether the head portrait information is valid, and if it is invalid, setting it as NULL, and if it is valid, downloading the corresponding head portrait information from the server.

Performing the synchronizing operation on the head portrait information based on the portrait status of the head portrait information may also include: (c) uploading the head portrait information from the local terminal to the server when the first determination result indicates that the head portrait information is not NULL in the local terminal and the second determination result indicates that the uniform resource locator is NULL in the server; (d) when the first determination result indicates that the head portrait information is not NULL in the local terminal and the second determination result indicates that the uniform resource locator is not NULL in the server, computing a hash value of the head portrait information in the local terminal to obtain a first hash value, acquiring a second hash value sent by the server, and determining whether the first hash value is different from the second hash value; (d1) determining whether historical synchronization information of the head portrait information exists in the local terminal when the first hash value is different from the second hash value; (d11) uploading the head portrait information from the local terminal to the server when the historical synchronization information of the head portrait information exists in the local terminal; (d12) downloading the head portrait information from the server through the uniform resource locator when no historical synchronization information of the head portrait information exists in the local terminal.

In other words, when it is determined that the head portrait information of the contact is not NULL in the local terminal, the head portrait information of the contact in the local terminal needs to be analyzed and compared to the head portrait information on the server so as to determine whether the head portrait information is up to date. If it is up to date, the synchronization is not performed, i.e., the synchronization is unnecessary to be performed on the head portrait information that has not changed, such that the processing rate may be speeded up. If it is not up to date, the corresponding head portrait information is downloaded from the server or the head portrait information in the local terminal is uploaded to the server.

The uniform resource locator URL, a concise representation of the location of resources that may be obtained via the Internet and the method for accessing the resources, is an address of the standard resource on the Internet. Each file on the Internet has a unique URL that contains information indicating the location of the file and how the browser should process it. A hashed value, also known as a hash value, is a short fixed-length binary value mapped from a binary value with a certain length. This small binary value is called a hash value. The hash value is a piece of data which is unique and extremely compact numerical representation, which is not described in detail herein.

It can be seen that, with the method for synchronizing the contact information provided in the embodiment, when the head portrait information and the corresponding feature identification data are acquired, the portrait status of the head portrait information is determined based on the feature identification data, and a synchronizing operation is performed on the head portrait information based on the portrait status. In other words, in the embodiment of the present disclosure, the portrait status of the head portrait information may be determined by using the feature identifier data of the head portrait information, such that the synchronization operation is performed on the head portrait information based on the portrait status when the head portrait information is synchronized, thereby utilizing the feature identification data of the head portrait information to avoid unnecessary data transmission during the synchronization of contact information, to reduce traffic waste and to optimize synchronization efficiency.

According to the method described in the above embodiments, detail descriptions will be made as follows.

Firstly, the head portrait information needs to be supported during the synchronization of the contact information. However, the head portrait information is generally large (>20 KB). If the head portrait information is directly uploaded to the server or downloaded from the server like other data (such as phone numbers, emails, etc.), the efficiency of the synchronization may be affected. Therefore, the present disclosure provides a method for synchronizing contact information, in which the head portrait information and the feature identification data in the contact information to be synchronized are extracted after the processing request is received, such that the feature identification data may be analyzed to determine the corresponding portrait status, so as to determine whether the synchronization is needed and what kind of manner should be taken to perform the synchronization based on the determined portrait status.

It can be understood that the embodiment of the present disclosure describes and analyzes the most common and widely used head portrait information. In some embodiments, other contact information with a large capacity which affects transmission efficiency may be processed in the same manner, which is not intended to limit the present disclosure.

Figure 3:
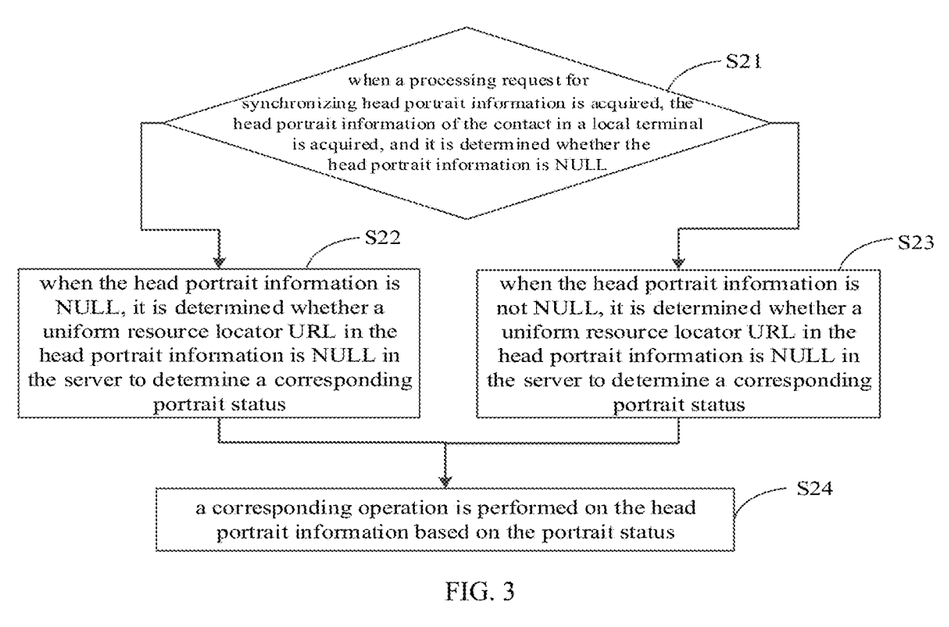
FIG. 3 illustrates a flow chart of a method for synchronizing contact information according to another embodiment of the present disclosure.

FIG. 3 is a flow chart of a method for synchronizing contact information according to another embodiment of the present disclosure. The method may specifically include followings. At block S21, when a processing request for synchronizing the head portrait information is acquired, head portrait information of the contact information in a local terminal is acquired, and it is determined whether the head portrait information is NULL. At block S22, when the head portrait information is NULL, it is determined whether a uniform resource locator URL in the head portrait information is NULL in the server to determine a corresponding portrait status. At block S23, when the head portrait information is not NULL, it is determined whether a uniform resource locator URL in the head portrait information is NULL in the server to determine a corresponding portrait status. At block S24, a corresponding operation is performed on the head portrait information based on the portrait status. It may be specifically described as follows.

At block S21, when a processing request for synchronizing the head portrait information is acquired, head portrait information of the contact in a local terminal is acquired, and it is determined whether the head portrait information is NULL.

For example, the user sends the processing request for synchronizing the head portrait information to a terminal (a mobile phone). The terminal acquires the head portrait information of a contact in the local terminal, and determines whether the head portrait information is NULL, i.e., determines whether the head portrait information exists.

Subsequently, it is determined whether a uniform resource locator URL in the head portrait information is NULL in the server according to the determination result of whether the portrait is NULL, and when the head portrait information is NULL, act in block S22 is performed; when the head portrait information is not NULL, act in block S23 is performed.

At block S22, when the head portrait information is NULL, it is determined whether a uniform resource locator URL in the head portrait information is NULL in the server to determine a corresponding portrait status.

Specifically, for example, when the head portrait information is NULL, it may be determined whether the URL of the contact's portrait is NULL in the server. In other words, it is determined whether the contact's portrait exists in the server, so as to determine whether the contact's portrait in the local terminal is valid according to the determination result.

Figure 4:
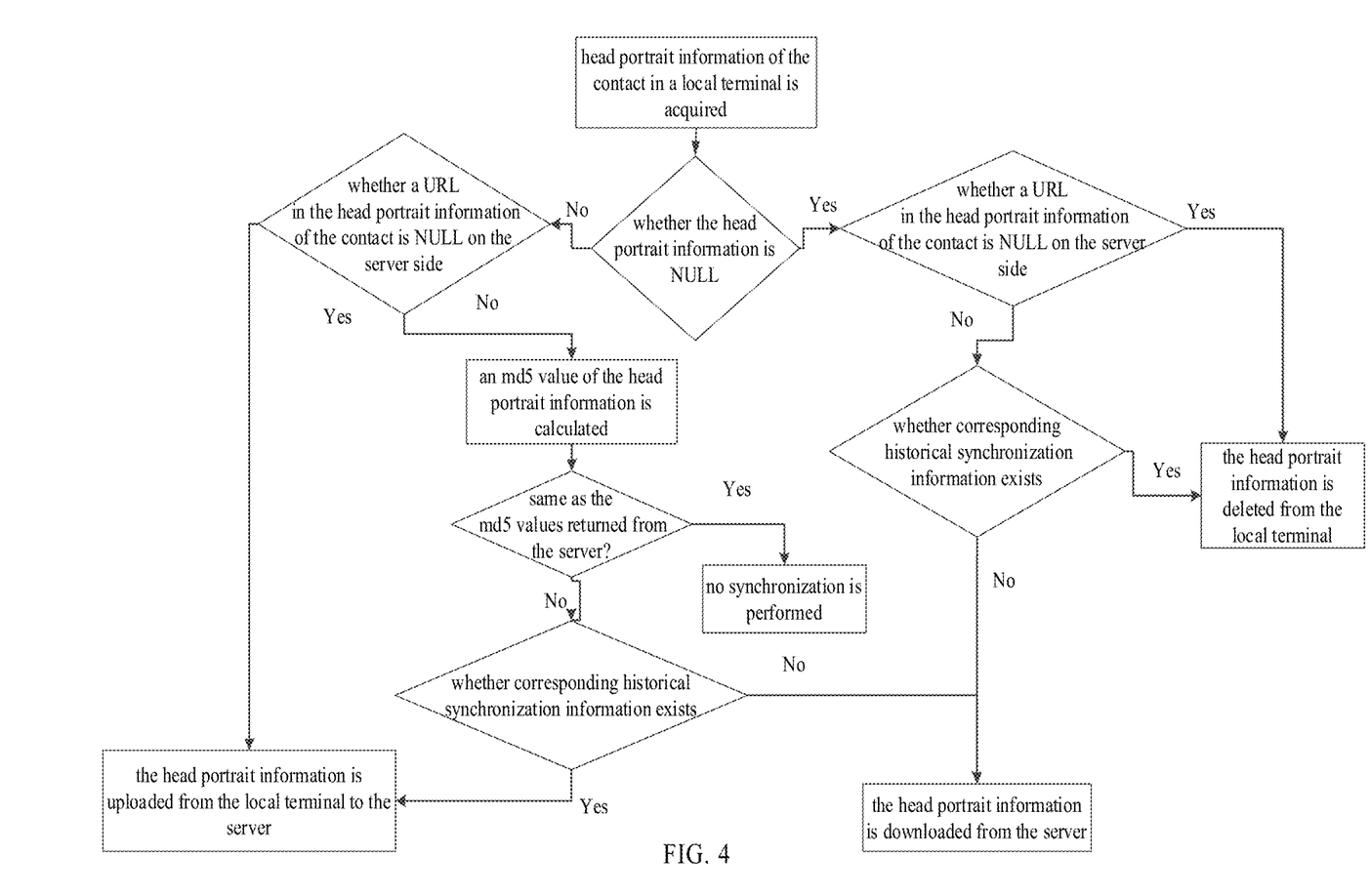
FIG. 4 illustrates a flow chart of determining portrait status and performing corresponding operations in the method provided in FIG. 3.

FIG. 4 is a flow chart of determining portrait status and performing corresponding operations including the followings.

1. When the URL of the contact's portrait is NULL on the server side, the head portrait information in the local terminal is set as NULL.

In other words, no valid head portrait information for this contact exists. Therefore, the "NULL" portrait record in the local terminal can be set as NULL.

2. When the URL of the contact's portrait is not NULL on the server side, it is determined whether historical synchronization information of the head portrait information exists.

In other words, it is determined whether the head portrait information in the local terminal has been synchronized with the head portrait information in the server. The historical synchronization information may be a mark or a symbol and the like for labeling after the synchronization.

2-1. When the historical synchronization information exists, the head portrait information in the local terminal is set as NULL.

In other words, when the head portrait information in the local terminal has been synchronized with the head portrait information in the server, it means that the user has set the head portrait information in the local terminal as NULL, such that the "NULL" portrait record in the local terminal can be set as NULL.

2-2. When no historical synchronization information exists, the head portrait information is downloaded from the server.

In other words, when the head portrait information in the local terminal has not been synchronized with the head portrait information in the server, it means that the head portrait information for the contact exists in the local terminal, which needs to be downloaded from the server by using the URL.

At block S23, when the head portrait information is not NULL, it is determined whether a uniform resource locator URL in the head portrait information is NULL in the server to determine a corresponding portrait status.

Specifically, for example, when the head portrait information is not NULL, it needs to be compared with the head portrait information in the server to determine whether it is up to date. When it is up to date, the synchronization is not performed. In other words, the head portrait information which has not been changed does not need to be synchronized, such that the processing rate is speeded up. When it is not up to date, the corresponding head portrait information is downloaded from the server, or the head portrait information in the local terminal is uploaded to the server, referring to FIG. 3 at the meantime.

3. When the URL of the contact's portrait is NULL on the server side, the head portrait information in the local terminal is uploaded to the server.

In other words, when the URL of contact's portrait is NULL on the server side, it means that the contact's portrait may be a new-added portrait, and therefore the head portrait information in the local terminal needs to be uploaded to the server to implement synchronizing the backup.

4. When the URL of the contact's portrait is not NULL on the server side, an md5 value of the head portrait information is calculated and compared with the md5 returned from the server side.

In other words, when the head portrait information is not NULL in the local terminal and the URL of the contact's portrait is not NULL on the server side, it is determined whether the head portrait information in the local terminal is the same as the contact's portrait of the server by using, for example, the md5 value, so as to determine whether synchronizing the backup is needed.

The md5 is a message digest algorithm, which is a hash function widely used in the field of computer security and used to ensure a complete and consistent information transmission so as to provide a message integrity protection.

4-1. When the md5 values are the same, no synchronization is performed.

In other words, when the md5 values in the local terminal and in the server are the same, it means that the head portrait information has been synchronized, and what needs to do is to update the synchronization status, such as updating the portrait status to a synchronized status, updating the update time, updating the terminal information and the like, such that the head portrait information does not need to be uploaded to the server or downloaded from the server.

4-2. When the md5 values is different, it is determined whether historical synchronization information of the head portrait information exists in the local terminal.

4-2-1. When the historical synchronization information exists, the head portrait information in the local terminal is uploaded to the server.

4-2-2. When no historical synchronization information exists, the head portrait information is downloaded from the server.

For example, when the md5 values in the local terminal and the server are not the same, it is necessary to determine the synchronization status. For example, it is determined whether the head portrait information in the local terminal has been synchronized with the head portrait information of the server. The historical synchronization information may be a mark or a symbol and the like for labeling after the synchronization.

If it has been synchronized, it means that the contact's portrait has been modified locally in the terminal, and the user needs to upload it to the server. If it has not been synchronized, it means that the portrait in the server is up to date and the user needs to download it from the server.

At block S24, a corresponding operation is performed on the head portrait information based on the portrait status.

As shown in FIG. 4, the corresponding operation (uploading to the server or downloading from the server) is performed on the head portrait information based on the portrait status determined at the previous step, and those portraits that have been synchronized and updated are skipped (step 2321), such that the operation of the synchronizing backup is well-directed, efficient, and the user experience can be greatly improved.

It can be seen that, with the method for synchronizing the contact information provided in the embodiment, when the head portrait information and the corresponding feature identification data are acquired, the portrait status of the head portrait information is determined based on the feature identification data, and a synchronizing operation is performed on the head portrait information based on the portrait status. In other words, in the embodiment of the present disclosure, the portrait status of the head portrait information may be determined by using the feature identifier data of the head portrait information, such that the synchronization operation such as uploading to the server or downloading from the server is performed on the head portrait information based on the portrait status when the head portrait information is synchronized, and those portraits that have been synchronized and updated are skipped (step 2321), thereby avoiding unnecessary data transmission during the synchronization of contact information, making the operation of the synchronizing backup well-directed and efficient, and reducing traffic waste.

In order to facilitate the implementation of the method for synchronizing the contact information provided in the embodiment of the present disclosure, embodiments of the present disclosure further provide an apparatus and system based on the method for synchronizing the contact information. The meanings of the nouns are the same as those described in the method for synchronizing the contact information, and the specific implementation details may refer to the description in the method embodiment.

An apparatus for synchronizing contact information is provided. The apparatus includes: a first acquiring unit, configured to acquire a processing request for synchronizing the contact information; a second acquiring unit, configured to acquire head portrait information in the contact information and feature identification data of the head portrait information in response to the processing request; a determining unit, configured to determine portrait status of the head portrait information based on the feature identification data; and a synchronizing unit, configured to perform a synchronizing operation on the head portrait information based on the portrait status of the head portrait information.

In some embodiments, the apparatus also includes: a judging unit, configured to determine whether the head portrait information is NULL in a local terminal to obtain a first determination result; the determining unit includes: a retrieving subunit, configured to retrieve a uniform resource locator in the feature identification data from a server; a first judging subunit, configured to determine whether the uniform resource locator in the feature identification data is NULL in the server to obtain a second determination result; and a determining subunit, configured to determine the first determination result and the second determination result as the portrait status of the head portrait information.

In some embodiments, the synchronizing unit includes: a deleting subunit, configured to set the head portrait information in the local terminal as NULL when the first determination result indicates that the head portrait information is NULL in the local terminal and the second determination result indicates that the uniform resource locator is NULL in the server; a second judging subunit, configured to determine whether historical synchronization information of the head portrait information exists in the local terminal when the first determination result indicates that the head portrait information is NULL in the local terminal and the second determination result indicates that the uniform resource locator is not NULL in the server; the deleting subunit being configured to set the head portrait information in the local terminal as NULL when the historical synchronization information of the head portrait information exists in the local terminal; and a downloading subunit, configured to download the head portrait information from the server through the unified resource locator when no historical synchronization information of the head portrait information exists in the local terminal.

In some embodiments, the synchronizing unit also includes: an uploading subunit, configured to unload the head portrait information from the local terminal to the server when the first determination result indicates that the head portrait information is not NULL in the local terminal and the second determination result indicates that the uniform resource locator is NULL in the server; a computing subunit, when the first determination result indicates that the head portrait information is not NULL in the local terminal and the second determination result indicates that the uniform resource locator is not NULL in the server, configured to compute a hash value of the head portrait information in the local terminal to obtain a first hash value, and to acquire a second hash value sent by the server; a third judging subunit, configured to determine whether the first hash value is different from the second hash value; the third judging subunit being configured to determine whether historical synchronization information of the head portrait information exists in the local terminal when the first hash value is different from the second hash value; the uploading subunit being configured to upload the head portrait information from the local terminal to the server when the historical synchronization information of the head portrait information exists in the local terminal; and a downloading subunit, configured to download the head portrait information from the server through the uniform resource locator when no historical synchronization information of the head portrait information exists in the local terminal.

Figure 5:
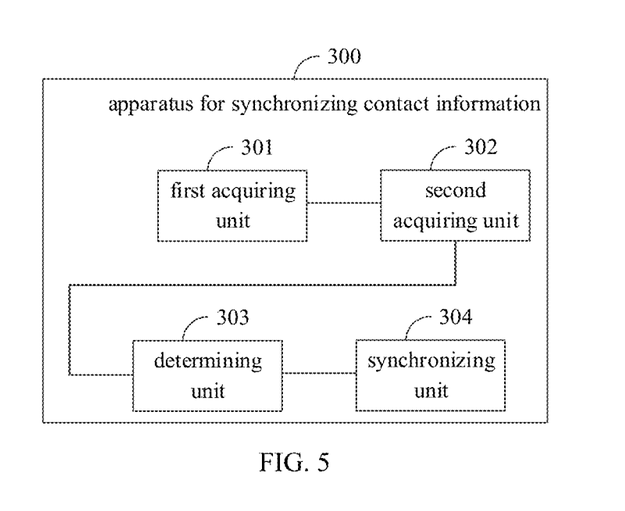
FIG. 5 illustrates a block diagram of an apparatus for synchronizing contact information according to an embodiment of the present disclosure.

FIG. 5 is a block diagram of an apparatus 300 for synchronizing contact information according to an embodiment of the present disclosure. The apparatus 300 for synchronizing contact information may include: a first acquiring unit 301, a second acquiring unit 302, a determining unit 303 and a synchronizing unit 304.

The first acquiring unit 301 is configured to acquire a processing request for synchronizing the contact information.

For example, the apparatus for synchronizing the contact information is integrated on the terminal, and the terminal may be preset with a synchronization input interface, such as a terminal application APP for the synchronization, or an input control. The user may trigger the synchronization input interface by clicking, touching, sliding and the like to acquire the processing request for synchronizing the contact information inputted by the user.

The contact information in the embodiments of the present disclosure may specifically include the phone information, the mailbox information, the address information, the head portrait information and the like of the contacts.

The second acquiring unit 302 is configured to acquire head portrait information in the contact information and feature identification data of the head portrait information in response to the processing request.

For example, the apparatus for synchronizing the contact information extracts the head portrait information in the contact information that needs to be synchronized in response to the acquired processing request, and extracts the feature identification data associated with the head portrait information (i.e., the feature identification data representing the head portrait information) at the same time.

It can be understood that, the head portrait information needs to be supported during the synchronization of the contact information. However, the head portrait information is generally large (>20 KB). Therefore, in embodiments of the present disclosure, after the apparatus for synchronizing the contact information receives the processing request, the head portrait information and the feature identification data in the contact information to be synchronized are extracted, such that the feature identification data may be analyzed to determine whether the head portrait information needs to be synchronized.

The feature identification data of the head portrait information in embodiments of the present disclosure mainly refers to data that may represent or identify the head portrait information, such as a hash value, a uniform resource locator URL, and the like.

The determining unit 303 is configured to determine portrait status of the head portrait information based on the feature identification data.

For example, after the apparatus for synchronizing contact information obtains the feature identification data of the head portrait information, the feature identification data may be analyzed and determined, such that the portrait status of the head portrait information is determined based on the result of the analysis and determination.

In some embodiments, the correspondences between the determination results and the portrait statuses may be preset in the apparatus for synchronizing contact information. The portrait status of the head portrait information may be determined based on the head portrait information and feature identification data stored in the terminal itself and stored on the server, which will not be limited herein.

The synchronizing unit 304 is configured to perform a synchronizing operation on the head portrait information based on the portrait status of the head portrait information.

The uniform resource locator URL, a concise representation of the location of resources that may be obtained via the Internet and the method for accessing the resources, is an address of the standard resource on the Internet. Each file on the Internet has a unique URL that contains information indicating the location of the file and how the browser should process it. A hashed value, also known as a hash value, is a short fixed-length binary value mapped from a binary value with a certain length. This small binary value is called a hash value. The hash value is a piece of data which is unique and extremely compact numerical representation, which is not described in detail herein.

Figure 6:
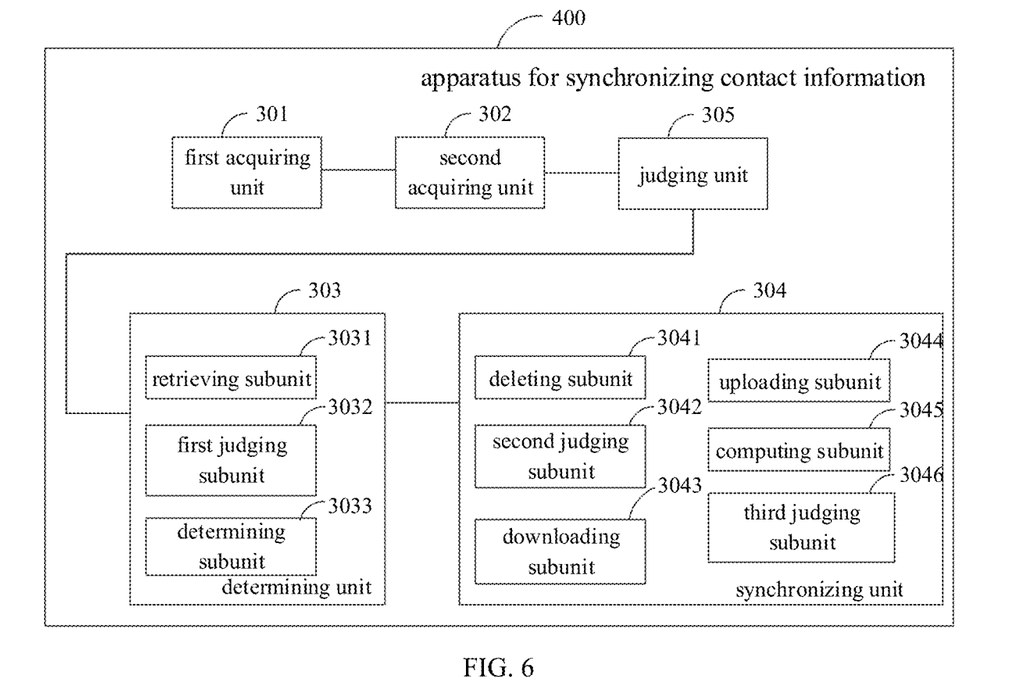
FIG. 6 illustrates a block diagram of an apparatus for synchronizing contact information according to another embodiment of the present disclosure.

FIG. 6 is a block diagram of an apparatus 400 for synchronizing contact information according to another embodiment of the present disclosure. The apparatus 400 for synchronizing the contact information may also include: a judging unit 305, configured to determine whether the head portrait information is NULL in a local terminal to obtain a first determination result.

In other words, it is determined whether the head portrait information of the contact exists in the local terminal, such that the first determination result is obtained. If the head portrait information exists, the head portrait information is not NULL, and if the head portrait information does not exist, the head portrait information is NULL.

Therefore, the determining unit 303 may include: a retrieving subunit 3031, configured to retrieve a uniform resource locator in the feature identification data from a server; a first judging subunit 3032, configured to determine whether the uniform resource locator in the feature identification data is NULL in the server to obtain a second determination result; and a determining subunit 3033, configured to determine the first determination result and the second determination result as the portrait status of the head portrait information.

In other words, the head portrait information that needs to be synchronized and the feature identification data of the head portrait information are searched from the server firstly, and then the uniform resource locator URL is retrieved from the feature identification data, and it is determined whether the uniform resource locator URL is NULL in the server to acquire the second determination result, and finally the portrait status of the head portrait information is determined according to the first determination result and the second determination result.

For example, the portrait status of the head portrait information may include the following four conditions: (1) the first determination result indicates that the head portrait information is NULL in the local terminal, and the second determination result indicates that the uniform resource locator is also NULL in the server; (2) the first determination result indicates that the head portrait information is NULL in the local terminal, and the second determination result indicates that the uniform resource locator is not NULL in the server; (3) the first determination result indicates that the head portrait information is not NULL in the local terminal, and the second determination result indicates that the uniform resource locator is NULL in the server; (4) the first determination result indicates that the head portrait information is not NULL in the local terminal, and the second determination result indicates that the uniform resource locator is not NULL in the server.

The corresponding synchronization operations will be described based on the four portrait statuses.

As shown in FIG. 6, the synchronizing unit 304 may specifically include followings.

A deleting subunit 3041 is configured to set the head portrait information in the local terminal as NULL when the first determination result indicates that the head portrait information is NULL in the local terminal and the second determination result indicates that the uniform resource locator is NULL in the server.

A second judging subunit 3042 is configured to determine whether historical synchronization information of the head portrait information exists in the local terminal when the first determination result indicates that the head portrait information is NULL in the local terminal and the second determination result indicates that the uniform resource locator is not NULL in the server.

The deleting subunit 3041 is configured to set the head portrait information in the local terminal as NULL when the historical synchronization information of the head portrait information exists in the local terminal.

A downloading subunit 3043 is configured to download the head portrait information from the server through the unified resource locator when no historical synchronization information of the head portrait information exists in the local terminal.

In other words, when it is determined that the head portrait information of the contact is NULL in the local terminal, it is necessary to determine whether the head portrait information is valid, and if it is invalid, set it as NULL, and if it is valid, download the corresponding head portrait information from the server.

As shown in FIG. 6, the synchronizing unit 304 may also include the followings.

An uploading subunit 3044 is configured to unload the head portrait information from the local terminal to the server when the first determination result indicates that the head portrait information is not NULL in the local terminal and the second determination result indicates that the uniform resource locator is NULL in the server.

When the first determination result indicates that the head portrait information is not NULL in the local terminal and the second determination result indicates that the uniform resource locator is not NULL in the server, a computing subunit 3045 is configured to compute a hash value of the head portrait information in the local terminal to obtain a first hash value, and to acquire a second hash value sent by the server.

A third judging subunit 3046 is configured to determine whether the first hash value is different from the second hash value.

The third judging subunit 3046 is configured to determine whether historical synchronization information of the head portrait information exists in the local terminal when the first hash value is different from the second hash value.

The uploading subunit 3044 is configured to upload the head portrait information from the local terminal to the server when the historical synchronization information of the head portrait information exists in the local terminal.

The downloading subunit 3043 is configured to download the head portrait information from the server through the uniform resource locator when no historical synchronization information of the head portrait information exists in the local terminal.

In other words, when it is determined that the head portrait information of the contact is not NULL in the local terminal, the head portrait information of the contact in the local terminal needs to be analyzed and compared to the head portrait information on the server so as to determine whether the head portrait information of the contact in the local terminal is up to date. If it is up to date, the synchronization is not performed, i.e., the synchronization is unnecessary to be performed on the head portrait information that has not changed, so as to speed up the processing rate. If it is not up to date, the corresponding head portrait information is downloaded from the server or the head portrait information in the local terminal is uploaded to the server.

In specific implementations, the foregoing units may be implemented as separate entities, and may be implemented in any combination to be implemented as the same or a plurality of entities. Specific implementations of the foregoing units may refer to the above method embodiments, which will not be described in detail herein.

The apparatus for synchronizing contact information may be specifically integrated in a terminal such as a tablet computer or a mobile phone.

It can be seen that, with the apparatus for synchronizing the contact information provided in the embodiment, when the head portrait information and the corresponding feature identification data are acquired, the portrait status of the head portrait information is determined based on the feature identification data, and a synchronizing operation is performed on the head portrait information based on the portrait status. In other words, in the embodiment of the present disclosure, the portrait status of the head portrait information may be determined by using the feature identifier data of the head portrait information, such that the synchronization operation is performed on the head portrait information based on the portrait status when the head portrait information is synchronized, thereby utilizing the feature identification data of the head portrait information to avoid unnecessary data transmission during the synchronization of contact information, to reduce traffic waste and to optimize synchronization efficiency.

An electronic device is provided. The electronic device includes a memory, a processor, and a computer program being stored in the memory and executable by the processor. The processor is caused to perform following acts when executing the computer program: acquiring a processing request for synchronizing the contact information; acquiring head portrait information in the contact information and feature identification data of the head portrait information in response to the processing request; determining portrait status of the head portrait information based on the feature identification data; and performing a synchronizing operation on the head portrait information based on the portrait status of the head portrait information.

In some embodiments, before determining the portrait status of the head portrait information based on the feature identification data, following acts are also included: determining whether the head portrait information is NULL in a local terminal to obtain a first determination result; and determining the portrait status of the head portrait information based on the feature identification data may include: retrieving a uniform resource locator in the feature identification data from a server; determining whether the uniform resource locator in the feature identification data is NULL in the server to obtain a second determination result; and determining the first determination result and the second determination result as the portrait status of the head portrait information.

In some embodiments, performing the synchronizing operation on the head portrait information based on the portrait status of the head portrait information may include: setting the head portrait information in the local terminal as NULL when the first determination result indicates that the head portrait information is NULL in the local terminal and the second determination result indicates that the uniform resource locator is NULL in the server; determining whether historical synchronization information of the head portrait information exists in the local terminal when the first determination result indicates that the head portrait information is NULL in the local terminal and the second determination result indicates that the uniform resource locator is not NULL in the server; setting the head portrait information in the local terminal as NULL when the historical synchronization information of the head portrait information exists in the local terminal; and downloading the head portrait information from the server through the uniform resource locator when no historical synchronization information of the head portrait information exists in the local terminal.

In some embodiments, performing the synchronizing operation on the head portrait information based on the portrait status of the head portrait information may include: uploading the head portrait information from the local terminal to the server when the first determination result indicates that the head portrait information is not NULL in the local terminal and the second determination result indicates that the uniform resource locator is NULL in the server; when the first determination result indicates that the head portrait information is not NULL in the local terminal and the second determination result indicates that the uniform resource locator is not NULL in the server, computing a hash value of the head portrait information in the local terminal to obtain a first hash value, acquiring a second hash value sent by the server, and determining whether the first hash value is different from the second hash value; determining whether historical synchronization information of the head portrait information exists in the local terminal when the first hash value is different from the second hash value; and uploading the head portrait information from the local terminal to the server when the historical synchronization information of the head portrait information exists in the local terminal; and downloading the head portrait information from the server through the uniform resource locator when no historical synchronization information of the head portrait information exists in the local terminal.

Figure 7:
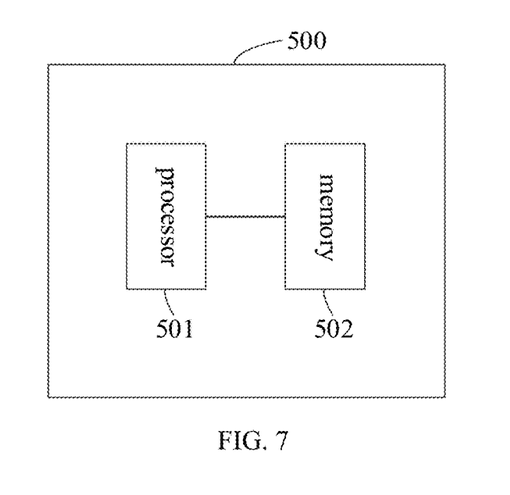
FIG. 7 illustrates a block diagram of an electronic device according to an embodiment of the present disclosure.
Figure 8:
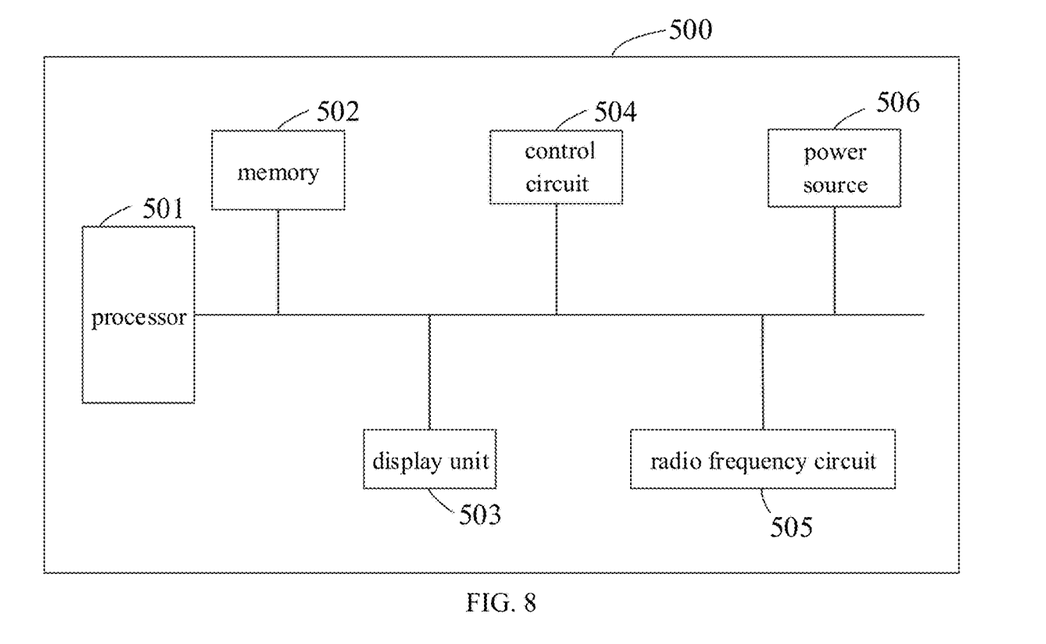
FIG. 8 illustrates a block diagram of an electronic device according to another embodiment of the present disclosure.

FIG. 7 is a block diagram of an electronic device according to an embodiment of the present disclosure, and FIG. 8 is a block diagram of an electronic device according to another embodiment of the present disclosure. The electronic device 500 includes a processor 501, a memory 502, a display unit 503, and a control circuit 504. Those skilled in the art will appreciate that the structure of the electronic device 500 illustrated in FIG. 5 does not constitute a limitation to the electronic device 500. The electronic device 500 may include more or less components than illustrated, or some components in combination, or different component arrangements. It should be noted that the electronic device 500 includes a smart phone, a tablet computer, and the like.

The processor 501 is a control center of the electronic device 500. The processor 501 connects various portions of the entire electronic device 500 using various interfaces and lines, performs various functions of the electronic device 500 and processes data by running or executing applications stored in the memory 502, and invoking data stored in the memory 502, so as to provide an overall monitoring for the electronic device 500.

The processor 501 loads executable files of one or more program processes into the memory 502 according to following instructions, and the processor 501 may execute the program stored in the memory 502, thereby implementing various functions: acquiring a processing request for synchronizing the contact information; acquiring head portrait information in the contact information and feature identification data of the head portrait information in response to the processing request; determining portrait status of the head portrait information based on the feature identification data; and performing a synchronizing operation on the head portrait information based on the portrait status of the head portrait information.

In some embodiments, the processor 501 is further configured to: determine whether the head portrait information is NULL in a local terminal to obtain a first determination result, and to determine the portrait status of the head portrait information based on the feature identification data and the first determination result.

In some embodiments, the processor 501 is further configured to: retrieve a uniform resource locator in the feature identification data from a server; determine whether the uniform resource locator in the feature identification data is NULL in the server to obtain a second determination result; and determine the first determination result and the second determination result as the portrait status of the head portrait information.

In some embodiments, the processor 501 is further configured to set the head portrait information in the local terminal as NULL when the first determination result indicates that the head portrait information is NULL in the local terminal and the second determination result indicates that the uniform resource locator is NULL in the server.

In some embodiments, the processor 501 is further configured to: determine whether historical synchronization information of the head portrait information exists in the local terminal when the first determination result indicates that the head portrait information is NULL in the local terminal and the second determination result indicates that the uniform resource locator is not NULL in the server; set the head portrait information in the local terminal as NULL when the historical synchronization information of the head portrait information exists in the local terminal; and download the head portrait information from the server through the uniform resource locator when no historical synchronization information of the head portrait information exists in the local terminal.

In some embodiments, the processor 501 is further configured to upload the head portrait information from the local terminal to the server when the first determination result indicates that the head portrait information is not NULL in the local terminal and the second determination result indicates that the uniform resource locator is NULL in the server.

In some embodiments, when the first determination result indicates that the head portrait information is not NULL in the local terminal and the second determination result indicates that the uniform resource locator is not NULL in the server, the processor 501 is further configured to: compute a hash value of the head portrait information in the local terminal to obtain a first hash value, acquire a second hash value sent by the server, and determine whether the first hash value is different from the second hash value; determine whether historical synchronization information of the head portrait information exists in the local terminal when the first hash value is different from the second hash value; upload the head portrait information from the local terminal to the server when the historical synchronization information of the head portrait information exists in the local terminal; and download the head portrait information from the server through the uniform resource locator when no historical synchronization information of the head portrait information exists in the local terminal.

In some embodiments, the processor 501 is further configured to: set the head portrait information in the local terminal as NULL when the first determination result indicates that the head portrait information is NULL in the local terminal and the second determination result indicates that the uniform resource locator is NULL in the server; determine whether historical synchronization information of the head portrait information exists in the local terminal when the first determination result indicates that the head portrait information is NULL in the local terminal and the second determination result indicates that the uniform resource locator is not NULL in the server; set the head portrait information in the local terminal as NULL when the historical synchronization information of the head portrait information exists in the local terminal; and download the head portrait information from the server through the unified resource locator when no historical synchronization information of the head portrait information exists in the local terminal.

In some embodiments, the processor 501 is further configured to: upload the head portrait information from the local terminal to the server when the first determination result indicates that the head portrait information is not NULL in the local terminal and the second determination result indicates that the uniform resource locator is NULL in the server; when the first determination result indicates that the head portrait information is not NULL in the local terminal and the second determination result indicates that the uniform resource locator is not NULL in the server, compute a hash value of the head portrait information in the local terminal to obtain a first hash value, acquire a second hash value sent by the server, and determine whether the first hash value is different from the second hash value; determine whether historical synchronization information of the head portrait information exists in the local terminal when the first hash value is different from the second hash value; upload the head portrait information from the local terminal to the server when the historical synchronization information of the head portrait information exists in the local terminal; and download the head portrait information from the server through the uniform resource locator when no historical synchronization information of the head portrait information exists in the local terminal.

The memory 502 may be configured to store application programs and data. The application programs stored in the memory 502 contain executable program codes. The application programs may form various functional modules. The processor 501 executes various functional applications and data processing by running an application stored in the memory 502.

The display screen 503 may be configured to display information inputted into the electronic device 500 by the user or information the electronic device 500 providing to the user and various graphical user interfaces of the electronic device 500. These graphical user interfaces may be composed of graphics, texts, icons, videos, and any combination thereof.

The control circuit 504 is electrically connected to the display screen 503 and configured to control the state of the display screen 503 under scheduling by the processor 501.

The electronic device 500 may also include a radio frequency circuit 505. The radio frequency circuit 505 is configured to send and receive a radio frequency signal, such as establishing a communication link with a plurality of servers, and receiving data packets sent from the server.

In some embodiments, the electronic device 500 also includes a power source 506. The power source 506 is configured to provide power to various components of electronic device 500. The power source 506 may be logically coupled to the processor 501 through a power management system to achieve functions such as charging, discharging, and power management through the power management system.

Although not shown in FIGS. 7 and 8, the electronic device 500 may also include a camera, a Bluetooth module, and the like, which will not be described in detail herein.

It can be seen that, with the electronic device provided in the embodiment of the present disclosure, when the head portrait information and the corresponding feature identification data are acquired, the portrait status of the head portrait information is determined based on the feature identification data, and a synchronizing operation is performed on the head portrait information based on the portrait status. In other words, in the embodiment of the present disclosure, the portrait status of the head portrait information may be determined by using the feature identifier data of the head portrait information, such that the synchronization operation is performed on the head portrait information based on the portrait status when the head portrait information is synchronized, thereby utilizing the feature identification data of the head portrait information to avoid unnecessary data transmission during the synchronization of contact information, to reduce traffic waste and to optimize synchronization efficiency.

There is provided a medium storing a plurality of instructions adaptive to be loaded by a processor to perform: acquiring a processing request for synchronizing the contact information; acquiring head portrait information in the contact information and feature identification data of the head portrait information in response to the processing request; determining portrait status of the head portrait information based on the feature identification data; and performing a synchronizing operation on the head portrait information based on the portrait status of the head portrait information.

It will be understood by those skilled in the art that, all or a part of the steps of various method in the above embodiments may be completed by instructions or by controlling related hardware, in which the instructions may be stored in a computer readable medium (such as a memory of the electronic device) and loaded and executed by at least one processor in the electronic device. The medium may include: a read only memory (ROM), a random access memory (RAM), a magnetic disk or an optical disk.

The method, apparatus for synchronizing the contact information, the medium, the electronic device and the system provided in embodiments of the present disclosure are described in detail. The principle and the implementation manners of the present disclosure are described in specific examples. The descriptions of the above embodiments merely facilitate to understand the method of the present disclosure and its core ideas. Meanwhile, for those skilled in the art, according to the idea of the present disclosure, there will be changes in the specific embodiments and application scopes, and the description is not to be construed to limit the present disclosure.

What is claimed is:

1. A method for synchronizing contact information, comprising:
   acquiring a processing request for synchronizing the contact information;
   acquiring, in response to the processing request, head portrait information in the contact information and feature identification data of the head portrait information, the feature identification data comprising a hash value and a uniform resource locator;
   determining whether the head portrait information is NULL in a local terminal to obtain a first determination result;
   retrieving the uniform resource locator in the feature identification data from a server;
   determining whether the uniform resource locator in the feature identification data is NULL in the server to obtain a second determination result;
   determining the first determination result and the second determination result as the portrait status of the head portrait information; and
   performing a synchronizing operation on the head portrait information based on the portrait status of the head portrait information, the synchronizing operation comprising an uploading operation, a download operation, and a deleting operation.

2. The method of claim 1, wherein performing the synchronizing operation on the head portrait information based on the portrait status of the head portrait information comprises:
   setting the head portrait information in the local terminal as NULL when the first determination result indicates that the head portrait information is NULL in the local terminal and the second determination result indicates that the uniform resource locator is NULL in the server.

3. The method of claim 1, wherein performing the synchronizing operation on the head portrait information based on the portrait status of the head portrait information comprises:
   determining whether historical synchronization information of the head portrait information exists in the local terminal when the first determination result indicates that the head portrait information is NULL in the local terminal and the second determination result indicates that the uniform resource locator is not NULL in the server;
   setting the head portrait information in the local terminal as NULL when the historical synchronization information of the head portrait information exists in the local terminal; and
   downloading the head portrait information from the server through the uniform resource locator when no historical synchronization information of the head portrait information exists in the local terminal.

4. The method of claim 1, wherein performing the synchronizing operation on the head portrait information based on the portrait status of the head portrait information comprises:
   uploading the head portrait information from the local terminal to the server when the first determination result indicates that the head portrait information is not NULL in the local terminal and the second determination result indicates that the uniform resource locator is NULL in the server.

5. The method of claim 1, wherein performing the synchronizing operation on the head portrait information based on the portrait status of the head portrait information comprises:
   when the first determination result indicates that the head portrait information is not NULL in the local terminal and the second determination result indicates that the uniform resource locator is not NULL in the server, computing the hash value of the head portrait information in the local terminal to obtain a first hash value, acquiring a second hash value sent by the server, and determining whether the first hash value is different from the second hash value;

determining whether historical synchronization information of the head portrait information exists in the local terminal when the first hash value is different from the second hash value;

uploading the head portrait information from the local terminal to the server when the historical synchronization information of the head portrait information exists in the local terminal; and downloading the head portrait information from the server through the uniform resource locator when no historical synchronization information of the head portrait information exists in the local terminal.

6. An apparatus for synchronizing contact information, comprising:

one or more processors;

a memory storing instructions executable by the one or more processors;

the one or more processors being configured to:

acquire a processing request for synchronizing the contact information;

acquire, in response to the processing request, head portrait information in the contact information and feature identification data of the head portrait information, the feature identification data comprising a hash value and a uniform resource locator;

determine whether the head portrait information is NULL in a local terminal to obtain a first determination result;

retrieve the uniform resource locator in the feature identification data from a server;

determine whether the uniform resource locator in the feature identification data is NULL in the server to obtain a second determination result;

determine the first determination result and the second determination result as the portrait status of the head portrait information; and perform a synchronizing operation on the head portrait information based on the portrait status of the head portrait information, the synchronizing operation comprising an uploading operation, a download operation, and a deleting operation.

7. The apparatus of claim 6, where the one or more processors are configured to perform the synchronizing operation on the head portrait information based on the portrait status of the head portrait information by performing acts of:

setting the head portrait information in the local terminal as NULL when the first determination result indicates that the head portrait information is NULL in the local terminal and the second determination result indicates that the uniform resource locator is NULL in the server.

8. The apparatus of claim 6, the one or more processors being configured to perform the synchronizing operation on the head portrait information based on the portrait status of the head portrait information by performing acts of:

unloading the head portrait information from the local terminal to the server when the first determination result indicates that the head portrait information is not NULL in the local terminal and the second determination result indicates that the uniform resource locator is NULL in the server.

9. A non-transitory computer storage medium, storing a plurality of instructions adaptive to be loaded by a processor, wherein when the plurality of instructions are executed, the processor is configured to:

acquire a processing request for synchronizing the contact information;

acquire, in response to the processing request, head portrait information in the contact information and feature identification data of the head portrait information, the feature identification data comprising a hash value and a uniform resource locator;

determine whether the head portrait information is NULL in a local terminal to obtain a first determination result;

retrieve the uniform resource locator in the feature identification data from a server;

determine whether the uniform resource locator in the feature identification data is NULL in the server to obtain a second determination result;

determine the first determination result and the second determination result as the portrait status of the head portrait information; and perform a synchronizing operation on the head portrait information based on the portrait status of the head portrait information, the synchronizing operation comprising an uploading operation, a download operation, and a deleting operation.

10. The apparatus of claim 6, wherein the one or more processors are configured to perform the synchronizing operation on the head portrait information based on the portrait status of the head portrait information by performing acts of:

determining whether historical synchronization information of the head portrait information exists in the local terminal when the first determination result indicates that the head portrait information is NULL in the local terminal and the second determination result indicates that the uniform resource locator is not NULL in the server;

setting the head portrait information in the local terminal as NULL when the historical synchronization information of the head portrait information exists in the local terminal; and downloading the head portrait information from the server through the uniform resource locator when no historical synchronization information of the head portrait information exists in the local terminal.

11. The apparatus of claim 6, wherein the one or more processors are configured to perform the synchronizing operation on the head portrait information based on the portrait status of the head portrait information by performing acts of:

when the first determination result indicates that the head portrait information is not NULL in the local terminal and the second determination result indicates that the uniform resource locator is not NULL in the server, computing the hash value of the head portrait information in the local terminal to obtain a first hash value, acquiring a second hash value sent by the server, and determining whether the first hash value is different from the second hash value;

determining whether historical synchronization information of the head portrait information exists in the local terminal when the first hash value is different from the second hash value;

uploading the head portrait information from the local terminal to the server when the historical synchronization information of the head portrait information exists in the local terminal; and downloading the head portrait information from the server through the uniform resource locator when no historical synchronization information of the head portrait information exists in the local terminal.

12. The non-transitory computer storage medium according to claim 9, wherein when the plurality of instructions are executed, the processor is further configured to:
setting the head portrait information in the local terminal as NULL when the first determination result indicates that the head portrait information is NULL in the local terminal and the second determination result indicates that the uniform resource locator is NULL in the server.

13. The non-transitory computer storage medium according to claim 9, wherein when the plurality of instructions are executed, the processor is further configured to:
determining whether historical synchronization information of the head portrait information exists in the local terminal when the first determination result indicates that the head portrait information is NULL in the local terminal and the second determination result indicates that the uniform resource locator is not NULL in the server;
setting the head portrait information in the local terminal as NULL when the historical synchronization information of the head portrait information exists in the local terminal; and
downloading the head portrait information from the server through the uniform resource locator when no historical synchronization information of the head portrait information exists in the local terminal.

14. The non-transitory computer storage medium according to claim 9, wherein when the plurality of instructions are executed, the processor is further configured to:
uploading the head portrait information from the local terminal to the server when the first determination result indicates that the head portrait information is not NULL in the local terminal and the second determination result indicates that the uniform resource locator is NULL in the server;
when the first determination result indicates that the head portrait information is not NULL in the local terminal and the second determination result indicates that the uniform resource locator is not NULL in the server, computing the hash value of the head portrait information in the local terminal to obtain a first hash value, acquiring a second hash value sent by the server, and determining whether the first hash value is different from the second hash value;
determining whether historical synchronization information of the head portrait information exists in the local terminal when the first hash value is different from the second hash value;
uploading the head portrait information from the local terminal to the server when the historical synchronization information of the head portrait information exists in the local terminal; and
downloading the head portrait information from the server through the uniform resource locator when no historical synchronization information of the head portrait information exists in the local terminal.

\* \* \* \* \*